United States Patent [19]

Thompson et al.

[11] Patent Number: 4,726,845
[45] Date of Patent: Feb. 23, 1988

[54] HYBRID MARKING INSTRUMENT AND WRITING INK COMPOSITION

[75] Inventors: John Thompson, Janesville, Wis.; Philip Wallis, San Diego, Calif.

[73] Assignee: Parker Pen (Benelux) B.V., Netherlands

[21] Appl. No.: 870,547

[22] Filed: Jun. 4, 1986

[51] Int. Cl.$^4$ ............................................. C09D 11/14
[52] U.S. Cl. ......................................... 106/25; 106/26; 106/209; 106/217; 524/27; 524/31; 524/32; 524/55; 524/58
[58] Field of Search ..................... 106/25, 26, 20, 217, 106/209; 524/27, 31, 55, 32, 58

[56] References Cited

U.S. PATENT DOCUMENTS 4,483,848  11/1984  Cox et al. .............................. 424/49
4,506,044  3/1985  Cox et al. .............................. 524/27

Primary Examiner—Amelia Burgess Yarbrough
Attorney, Agent, or Firm—Schwartz Jeffery Schwaab Mack Blumenthal & Evans

[57] ABSTRACT

A writing ink composition having a pseudoplasticity index value between about 0.02 and 0.18, a low-shear viscosity between about 25,000 and 120,000 cP, and a high-shear viscosity between about 6 and 26 cP can be used in a hybrid, ball-point marking instrument which combines advantageous features of both paste-ink and liquid-ink ballpens. The writing ink can be prepared using a colloid milling procedure.

25 Claims, 9 Drawing Figures

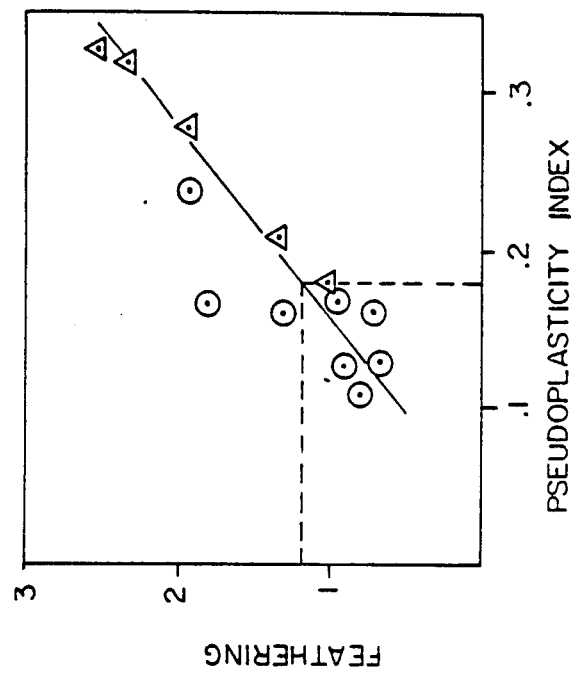
FIG. 7A. EFFECT OF PSEUDOPLASTICITY INDEX ON FEATHERING
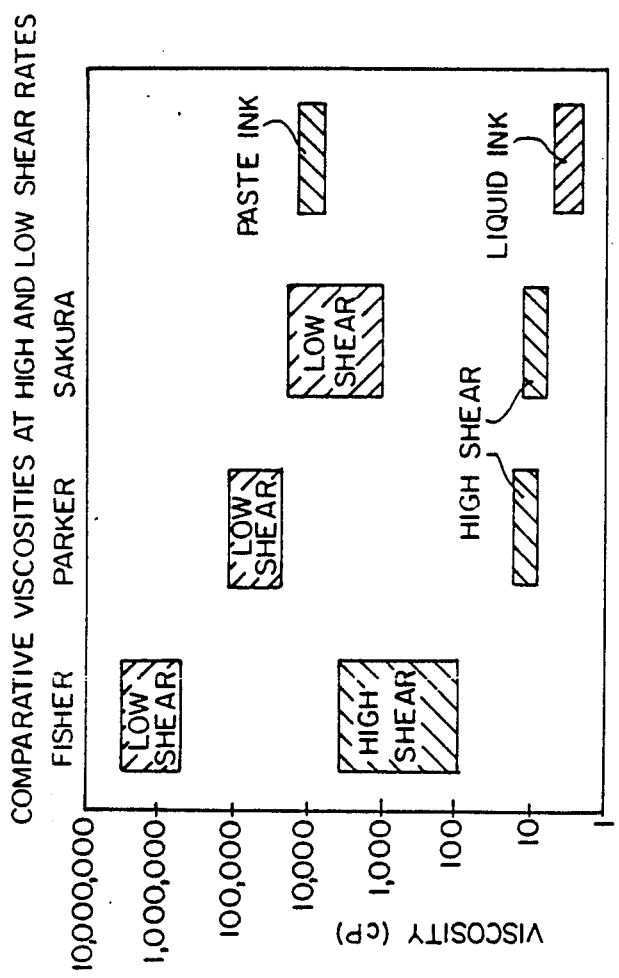
FIG. 5. COMPARATIVE VISCOSITIES AT HIGH AND LOW SHEAR RATES
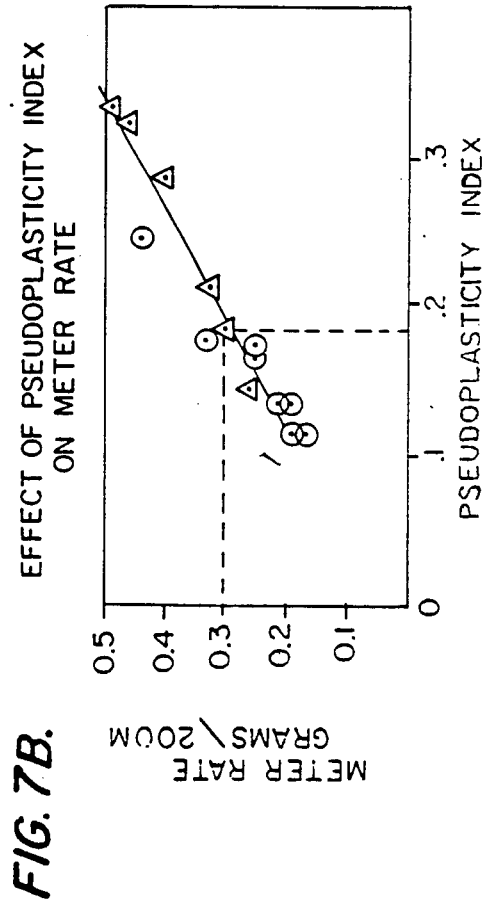
FIG. 7B. EFFECT OF PSEUDOPLASTICITY INDEX ON METER RATE

HYBRID MARKING INSTRUMENT AND WRITING INK COMPOSITION

BACKGROUND OF THE INVENTION

The present invention relates to a hybrid marking instrument which combines the advantageous features of a typical paste-ink ball-point pen reservoir with those of a liquid-ink ball-point pen front end assembly, and to a hybrid ink composition for use in the hybrid marking instrument.

In the writing pen art, a "paste" ink is so characterized by virtue of its high viscosity, normally in excess of 8,000 centipoise (cP). A ball-point pen which uses a paste ink needs only a comparatively simple system for controlling ink flow, comprising either a capillary tube closed at one end by the ball-point assembly or a larger diameter tube, similarly closed at the point, with a viscous follower at the open end to prevent back leaking and evaporation of the ink. The flow of ink in a paste-ink ballpen is thus dependent upon the viscosity of the ink and on the clearances between the ball and its housing.

The paste-ink ballpen has at least two serious disadvantages. First, the high viscosity of the ink causes the pen to drag on the paper during writing, and the user must therefore press harder to generate a satisfactory line. Also, in order that the ink does not smudge on the paper, the rate at which ink is metered onto the paper during normal writing must be low. As a consequence, the line intensity of a paste-ink pen is usually low.

These problems can be ameliorated by using a "liquid" ink, that is, an ink composition having a viscosity that is in the range of 1.0 to 5.0 cP. In a liquid-ink ball-point pen, the low viscosity ink gives free flowing writing at low writing forces and, additionally, provides a high intensity line. For both the manufacturer and the end user, however, there are other disadvantages inherent in the liquid-ink ballpen:

(A) The liquid-ink ballpen is not as smooth writing as the paste-ink ballpen because low viscosity liquid ink does not provide adequate lubrication for the ball. This poor lubrication also contributes to a high degree of wear of the ball in the housing.

(B) The reservoir in the liquid-ink ballpen must be vented directly to the atmosphere so that air can replace the ink used. Since the liquid inks are generally water based, they are prone to evaporation, even when humectants such as polyhydric alcohols and glycol ethers are added. In the paste-ink ballpen, the ink can be protected from evaporation by the use of a viscous follower.

(C) Liquid-ink ball-point pens are prone to "feathering," or the spreading of the ink on the paper, giving a very ragged edge to the written line. Increased uses of humectants to lessen the dryout problem (B) enhances feathering.

(D) The liquid-ink ball-point pen must employ a costly ink-flow control system which incorporates a capillary reservoir or a vacuum reservoir, as explained in U.S. Pat. No. 3,951,555, the contents of which are hereby incorporated by reference. In a capillary reservoir system, the ink reservoir includes an absorber, similar in design to a cigarette filter, which retains the ink within the reservoir by capillary attraction. In a vacuum reservoir system, the ink is held in a hollow, typically tubular reservoir by the imposition of a negative pressure which results from the configuration of ink and air-control passages connecting the reservoir to the point and a surge tank, or "collector." Ink expelled from the reservoir by changes in pressure is retained in the collector by capillary attraction, i.e., vacuum and capillary reservoir systems alike rely on capillary forces to transmit the liquid ink to the ball.

(E) Both types of liquid-ink control systems are prone to uneven, intermittent ink flow when capillary flow is interrupted. Capillary reservoir systems in particular give uneven flow control. As the ink is used up during writing, the remaining ink is also maintained in smaller capillary spaces under more and more negative hydrostatic pressures. The ink does not flow as easily from these tighter capillary spaces, resulting in a gradual decline in meter rate and, hence, a less intense written line.

Writing compositions heretofore employed in ball-point pens have generally suffered from the respective drawbacks of liquid or paste inks, as summarized above. One approach to overcoming these disadvantages has been to incorporate into an ink composition a polymeric material which permits the ink to act as a liquid under some conditions and as a paste under other conditions. For example, British Patent Application No. 2,131,040 (hereinafter referred to as "Sakura") discloses such a "hybrid" aqueous ink composition, containing 0.2 to 0.45 part by weight of xanthan gum, that is used in a ball-point pen that includes, like a typical paste-ink pen, a "follower" member in the ink reservoir. The disclosed ink composition is said to posses many desirable properties, but low pen drag and high line intensity are not mentioned. British Patent Application No. 2,094,820 (hereinafter referred to as "Fisher") discloses a different hybrid ink composition, comprising a polyelectrolyte polymer and a high polarity solvent, that is used like a liquid ink in a ballpen having a sealed, pressurized ink reservoir. The disclosed pen is said to "write . . . almost as easily as unpressurized roller pens."

SUMMARY OF THE INVENTION

It is, therefore, an object of the present invention to provide a hybrid ball-point marking instrument that combines the design simplicity of a paste-ink ball-point pen with the line intensity and low drag of a liquid-ink ball-point pen.

It is also an object of the present invention to provide a hybrid writing ink composition that, because of its high viscosity under low shear conditions and low viscosity at high shear, can be used in the above-mentioned hybrid marking instrument.

It is another object of the present invention to provide a writing ink composition displaying sufficiently high viscosity at low shear to allow for a stable pigment dispersion therein over an extended time period.

It is a further object of the present invention to provide a writing ink composition that displays a higher high-shear viscosity, thereby allowing for greater smoothness in writing, and less wicking than typical liquid ink ballpen inks.

It is still another object of the present invention to provide a method for preparing the aforesaid hybrid writing ink.

In accomplishing the foregoing objects, there has been provided, in accordance with one aspect of the present invention, a writing ink composition comprising a pseudoplastic resin and a carrier medium in which the resin is soluble, the amount of said resin in the ink composition being such that the ink composition has (a) a pseudoplasticity index value between about 0.02 and 0.18, (b) a viscosity at 0.1 sec$^{-1}$ shear rate of between about 25,000 and 120,000 cP, and (c) a viscosity at 10,000 sec$^{-1}$ shear rate of between about 6 and 26 cP. In a preferred embodiment of the present invention, the ink composition has a yield stress value between about 25 and 250 dyne cm$^{-2}$.

In accordance with another aspect of the present invention, there has been provided a marking instrument comprising (a) an ink reservoir that defines a cavity which is under ambient pressure and which has a predetermined inner diameter; (b) a viscous follower disposed in the cavity; (c) a ball-point assembly communicating with the reservoir, the assembly comprising an annular seat member and a ball rotatably mounted in the seat member, the seat member having a central bore and a plurality of grooves extend radially through from the inner surface to the outer surface of the seat member; and (d) a volume of the above-described writing ink composition disposed in the cavity between the viscous follower and the ball-point assembly. In one preferred embodiment, the predetermined inner diameter of the ink reservoir cavity is such that capillary attraction between the volume of writing ink and the reservoir has substantially no effect on retention of the composition ink in the cavity.

There has also been provided, in accordance with yet another aspect of the present invention, a method for preparing a writing ink composition, comprising (i) an amount of at least one pseudoplastic resin and (ii) a carrier medium for the resin, the method comprising the steps of (1) adding a predetermined amount of the pseudoplastic resin to an organic liquid to produce a slurry of the resin; (2) mixing the resin slurry with a solvent comprising water and/or an organic solvent under sufficiently high shear conditions such that a partially solvated fine dispersion of the resin is produced; then (3) adding a colorant to the aforesaid dispersion and subjecting the dispersion to hydraulic shear such that a fully solvated fine dispersion (a lyophilic sol) of the resin is produced, the lyophilic sol having (i) a pseudoplasticity index value between about 0.02 and 0.18, (ii) a viscosity at 0.1 sec$^{-1}$ shear rate between about 25,000 and 120,000 cP and (iii) a viscosity at 10,000 sec$^{-1}$ shear rate between about 6 and 26 cP.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 5 and 6 are graphs depicting, respectively, the ranges of viscosities (high-and low-shear) and pseudoplasticities for ink compositions of the present invention and the prior art.

FIG. 7A and 7B are graphs that show the relationship between pseudoplasticity of an ink composition within the present invention and feathering (A) and meter rate (B), respectively (Δ: data point for ink composition containing K1A112 ® resin; o: data point for ink composition containing KELZAN S ® resin).

DETAILED DESCRIPTION OF THE PREFERRED EMBODIMENTS

Figure 1:
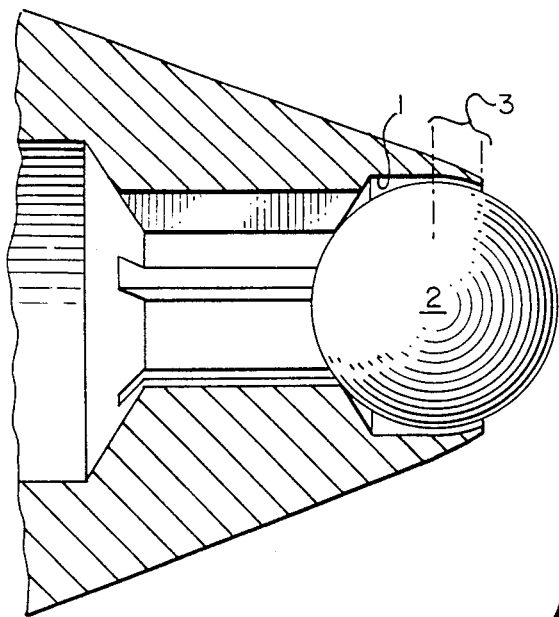
FIG. 1 is a line drawing presenting a fragmentary longitudinal sectional view of the ball point assembly of a conventional liquid ink ball-point pen.

The writing ink composition of the present invention is characterized as "pseudoplastic" because it has an apparent yield stress point beyond which shear rate (flow) increases sharply with increased shear stress (force). More specifically, the ink composition of the present invention exhibits flow at all shear stresses, but the ratio of flow to force increases negligibly until the force exceeds the apparent yield stress value. The pseudoplasticity of the ink composition can be defined in terms of its "pseudoplasticity index" value (n), which is related to viscosity ($\eta$) at shear rate $\gamma$ by the equation $$\log \eta = (n-1) \log \gamma + \log m,$$

where m is the ink viscosity in cP at a shear rate of one sec$^{-1}$.

For liquids and suspensions wherein the ratio of flow to force is constant (Newtonian substances), n is unity, i.e., viscosity is independent of the shear rate. For pseudoplastic materials, including the ink composition of the present invention, n is less than unity. For purposes of the present description, the viscosities of inks were measured over the shear range 0.01 to 10 sec$^{-1}$ on a Brookfield LVDT viscometer with small sample adaptor. Over the range 16 to 10,000 sec$^{-1}$, ink viscosities were determined with a Ferranti Shirley cone and plate viscometer. Yield stress values were determined on the Ferranti-Shirley viscometer after an initial rest time of 2 minutes. The pseudoplasticity index n was measured as the slope of the graph of log $\eta$ against log $\gamma$. This graph is not linear over the complete range of shear rates, so the pseudoplasticity index was determined for the maximum slope. This was normally in the shear rate range 0.1 to 10 sec$^{-1}$, where the graph is typically a straight line. The maximum slope gives the minimum value of the pseudoplasticity index.

It has been discovered that the above-summarized disadvantages of paste and liquid inks, respectively, can be obviated by using an ink that displays, in accordance with the present invention, the following rheological properties:

(a) a pseudoplasticity index value of less than about 0.18 and greater than about 0.02;

(b) viscosity at a shear rate of 0.1 sec$^{-1}$ (low shear) greater than about 25,000 cP, but less than about 120,000 cP; and (c) viscosity at a shear rate of 10,000 sec$^{-1}$ (high shear) greater than about 6 cP, but less than about 26 cP.

Because the ink of the present invention displays a low viscosity during writing, i.e., under high shear conditions, it is not subject to the disadvantages presented by paste inks. More specifically, the ink composition of the present invention provides high intensity writing without the high writing forces associated with the paste-ink ball-point pen. Furthermore, because the high-shear viscosity of the ink composition of the present invention is not as low as that of a typical liquid ink, the former ink lubricates the point more effectively and gives very smooth writing.

Since the ink composition of the present invention has a high viscosity under low shear conditions, it can be retained within a simple, hollow reservoir by a viscous (grease-type) follower of the sort typically used in paste-ink ball-point pens, so that the only route for ink evaporation is through the point. As the flow of an ink within the present invention can be controlled by viscous forces alone, rather than by capillary forces, even writing with no skipping is readily achieved, in contrast to the uneven writing which is characteristic of liquid inks. Moreover, the high degree of pseudoplasticity of the present ink composition overcomes the problem of feathering associated with liquid-ink ball-point pens. Thus, in the absence of thixotropy (increasing flow with increasing duration of agitation), the high degree of pseudoplasticity is a measure not only of the degree of shear thinning but also of the speed with which the ink rebuilds its viscosity. This rapid rebuilding of viscosity in the ink of the present invention reduces any tendency of the ink to feather.

Because capillary attraction is unnecessary to control ink flow in the present invention, the costly structural accoutrements of a capillary reservoir or vacuum reservoir system are likewise not needed. Thus, a ball-point pen within the present invention preferably employs the hollow, tubular reservoir typical of a paste-ink ballpen reservoir, entirely without the capillary filter or collector usually required when liquid inks are used.

By the same token, a marking instrument of the present invention need not have an inner diameter dimensioned so that capillary attraction between the ink and the reservoir substantially effects retention of the ink, as in a ballpen designed for use with paste inks. Accordingly, an inner reservoir diameter for a marking instrument of the present invention can have a maximum value of more than 2.5 mm, ranging up to 6 mm or more as design considerations dicate.

Figure 2:
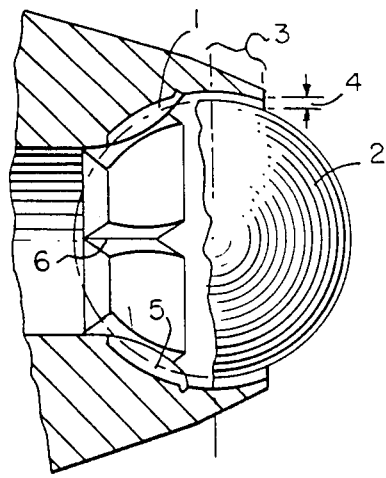
FIG. 2 is a line drawing presenting a fragmentary longitudinal sectional view of a conventional paste ink ball-point assembly.

Although the backend of marking instrument within the present invention is similar to that of a paste-ink ball-point pen, the ball-point assembly thereof resembles the assembly of a conventional liquid-ink ballpen. As shown in FIG. 1, the conventional liquid-ink ball point comprises a tapered body portion which at its narrower end presents a bore 1 into which the ball 2 is inserted. A paste-ink ball point also comprises a similar tapered body portion, usually of stainless steel. In a typical paste-ink ballpen, however, the ball is slightly larger than the bore, and the point must be subjected to a "heavy" spinning operation (that is, under intense pressure) to reduce the final ball protrusion. During the spinning operation, metal is induced to flow over a predetermined region, or "spin length" 3, which includes about 0.3 mm of the point. As a consequence, the point of a paste-ink ballpen is generally more sharply tapered along the spin length, to an angle of about 60°, and the border or "lip" of the orifice is "ironed" around the ball. The inherent elasticity of the point metal then causes the edges of the lip to spring back slightly, allowing clearance for ink flow. With reference to FIG. 2, the ball-to-lip clearance 4 in a conventional paste-ink ball-point assembly is typically between 0.003 and 0.004 mm. The ball-to-bore clearance 5 is estimated to be around 0.002 mm, although actual final bore diameters of paste-ink points are difficult to measure directly.

In contrast, the ball-point assembly of a marking instrument within the present invention, like the ball-point assembly of a conventional liquid-ink ball pen, provides a much larger area to accommodate ink flow than is available in a typical paste-ink assembly. More specifically, the ball-to-lip clearance of a marking instrument of the present invention is about 0.008 mm, while the ball-to-bore clearance is some 2.5 to 4 times than the corresponding value estimated for a paste-ink point. Preferably, the clearance between the ball and the bore in a hybrid marking instrument within the present invention is thus about 0.010 mm, with a typical tolerance being 0.004 mm. The seat member has a preferred seat angle, relative to the axis of the bore, of about 60°.

These preferred clearance dimensions of the present invention are readily achieved by boring the ball socket to its final size, inserting the ball into the socket and then bending ("crimping") the lip over the ball. Alternatively, a light spinning operation (low pressure) can be used. In either case, the ball is approximately 0.008 mm smaller than, and thus fits into, the orifice of the tapered body portion, which is preferably comprised of a "nickel silver" (high nickel brass) alloy or similarly malleable material. During the spinning operation, the point metal does not flow and ball protrusion is only slightly changed. Instead, the lip is bent slightly to retain the ball in the orifice. The spin length is, consequently, much shorter (about 0.06 mm), and the angle of taper larger (about 80°), in the ball-point assembly of the present invention than are corresponding dimensions in a conventional paste-ink ball-point assembly.

Aside from the above-mentioned differences in clearances, another feature of a ball-point assembly used in a marking instrument of the present invention, which distinguishes it from the conventional paste-ink assembly, also contributes to the larger area for ink flow available in the former assembly. In a paste-ink assembly as shown in FIG. 2, relatively shallow ink feed troughs or grooves 6 are coined into a seat member in the point, against which member the ball abuts during normal operation. The grooves, typically six in number and triangular in cross section, run the length of the seat member without extending radially therethrough.

Figure 3A:
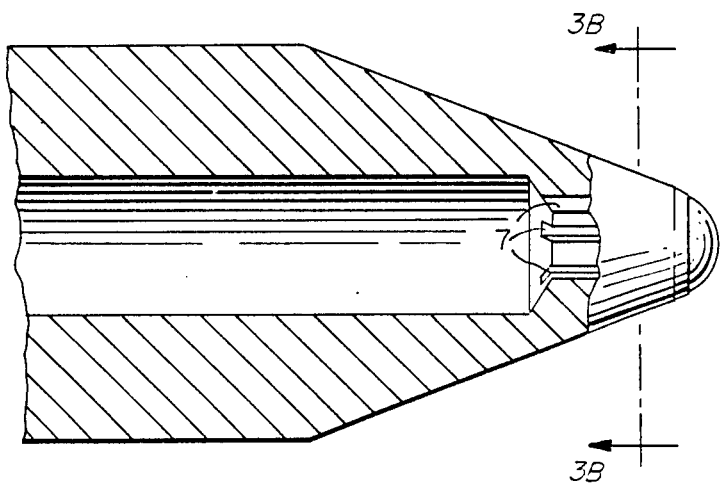
FIG. 3B shows a transverse cross-sectional view along line 3B—3B of FIG. 3A, which provides a fragmentary cross-sectional view, partly in elevation, of the ball point of a marking instrument within the present invention.
Figure 3B:
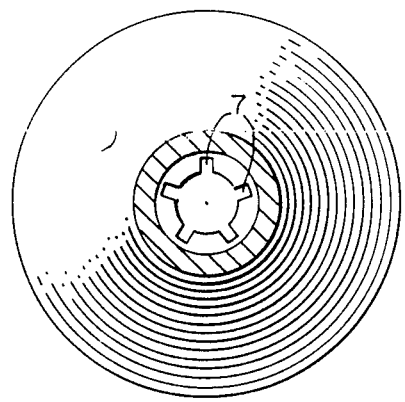

In contrast, a seat member suitable for a marking instrument of the present invention, as shown in FIGS. 3A and 3B, carries a plurality of grooves 7 that extend completely through the member in a radial direction, as in the case in a typical liquid ink point. The channels provided by the seat grooves for ink flowing from the capillary passage behind the seat member to the ball have a greater cross sectional area in the marking instrument of the present invention, as compared to a ballpen incorporating a typical paste-ink assembly. The grooves 7 that breach through the seat member into a capillary space (not shown) of the assembly, in accordance with the present invention, are preferably five in number and can have rectangular cross sections. The grooves carried by the seat member can have widths roughly equivalent to those characteristic of a conventional paste-ink assembly. Neither the number nor shape of the ink flow channels provided by the grooves is crucial, however, so long as the area thereby provided is sufficient to accommodate ink flow rates, characteristic of an ink composition within the present invention, that are four to five times the flow rate of a typical paste ink (about 0.03 g/200 m).

Figure 4:
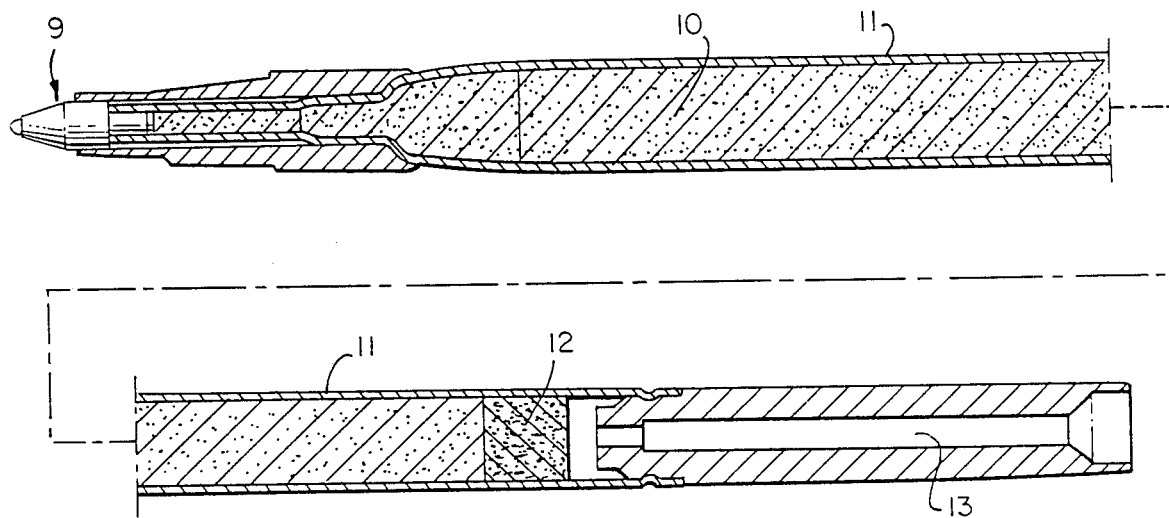
FIG. 4 is a drawing that provides a longitudinal cross-sectional view of a marking instrument within the present invention.

The general features of a marking instrument within the present invention are shown in FIG. 4. The point assembly 9 is similar in design to a liquid-ink ballpen assembly but, as described above permits greater access to the ball by ink 10 held in the reservoir of the refill shell 11. A viscous follower 12 is disposed in the reservoir, after the fashion of a paste-ink pen reservoir, between the ink and small orifice 13 which vents the reservoir to the atmosphere. As ink moves into the point assembly during writing and is deposited by the ball onto the writing surface, the level of ink in the refill shell falls, drawing the follower with it. Air to replace the ink used passes through orifice 13.

Both the configuration of the point assembly and the dimensions of the ink reservoir of a marking instrument within the present invention require that the ink used in the marking instrument have the rheological properties described above to achieve adequate writing quality. More specifically, an ink of the present invention possesses sufficient low-shear viscosity to be used in a marking instrument that incorporates, in accordance with the present invention, a paste-ink type backend, i.e., a backend which lacks a complex ink control system and, preferably, comprises a reservoir dimensioned so that capillary attraction plays virtually no role in the retaining of ink in the reservoir. On the other hand, the high-shear viscosity of the aforesaid ink is such that the ink provides adequate lubrication for the ball and, thereby, affords smooth writing, but can be laid down at a rate that ensures a line intensity comparable to that of a liquid ink. Pen drag and feathering are also minimized, further enhancing ease and clarity of writing.

The choice of pseudoplastic resin for use in the writing ink composition of the present invention is not critical, so long as the selected resin can be used in an amount sufficient to attain the above-mentioned rheological properties. Two heteropolysaccharide resins, KELZAN S ® and K1A112 ® (both manufactured by Kelco Company, San Diego Calif.), have proved particularly suitable. These resins differ to the extent that KELZAN S ® is a xanthan gum produced as a fermentate by pure cultures of *Xanthomonas campestras*, while K1A112 ® is a fermentate of an alcaligenad microorganism (accession no. ATCC 31961) described in U.S. Pat. No. 4,401,760, the contents of which are hereby incorporated by reference. Chemically, xanthan gum is composed of the monosaccharides mannose, glucose and glucuronic acid; in contrast, K1A112 ® is composed of glucuronic acid, glucose and rhamose.

It has been discovered that the writing composition of the present invention is preferably prepared using a novel method of mixing the ink constituents. More specifically, it is preferred that a slurry of the pseudoplastic resin in an organic liquid, such as a mixture of ethylene glycol and glycerol, be prepared separately. In this context, the term "organic liquid" means any organic material in which the pseudoplastic resin or resin mixture can be dispersed, but in which the resin is not readily soluble. Examples of other suitable organic liquids include tetrahydrothiophene 1-1 dioxide (manufactured by Shell Chemical Co., Houston, Tex.), N-methylpyrrolidone and gamma-butyrolactone (both manufactured by GAF Corp., New York N.Y.).

The resin slurry is then diluted with water or organic solvent, or a mixture of both water and organic solvent (water not being an essential ingredient of an ink of the present invention), under sufficiently high shear conditions to produce a partially solvated fine resin dispersion. Any desired corrosion inhibitors, smoothing agents, biocides and other conventional additives are preferably added prior to formation this fine dispersion. A dye solution or pigment dispersion is then added and mixed in to achieve the desired resin concentration. The partially solvated fine dispersion of the pseudoplastic resin is thereafter subjected to intense hydraulic shear in a colloid mill or similar device, whereby resin particles become fully solvated to form a lyophilic sol. After this shearing treatment, which apparently has never been employed before in preparing this type of pseudoplastic material, entrained gases in the ink composition are preferably removed, for example, by centrifugation. For writing inks of the present invention that contain K1A112 ® resin, it has been found that the above-mentioned colloid-milling step is required.

While the primary resin used in an ink composition of the present invention is mainly responsible for the rheology of the ink, the rheology can be influenced by the choice of surfactants, coresins and the major components of the solvent system. For example, the low-shear viscosity of the ink composition can be reduced, without affecting high-shear viscosity, by the addition of solvent- and resin-compatible anionic or nonionic surfactants. Conversely, the high-shear viscosity can be raised, without significantly affecting the viscosity at low shear, by adding a higher viscosity co-resin. A film forming co-resin, such as polyvinylpyrrolidone, can also be added to reduce low-shear viscosity selectively and, thereby, improve overall writing performance of the ink.

The rheology of an ink composition of the present invention can also be affected by the choice of dyes or pigments employed. A very wide variety of dye solutions and pigment compositions can be used in the present invention, so long as the pseudoplasticity and viscosity values of the final ink composition remains within the above-described ranges. The dye solutions BASA CID X34 ® (BASF Wyandotte Corp., Holland Mich.) and "Special Violet S4B5" (manufactured by Mobay Chemical Corp., Union N.J.) are illustrative of dyes suitable for use in the present invention. Suitable aqueous pigment dispersions include BASOFLEX BLUE 7080 ®, BASOFLEX RED 3855 ®, and LUCONYL GREEN 9360 ® (all manufactured by BASF Wyandotte Corp.). The low-shear viscosity of an ink composition of the present invention is sufficiently high to maintain a stable pigment dispersion over extended periods, a major advantage. Pigments provide greater permanence of line than do dye-based systems, but preparation of pigment-dispersion inks in accordance with the present invention requires that the surfactant be selected to prevent agglomeration of pigment particles without substantially influencing ink rheology.

Figure 6:
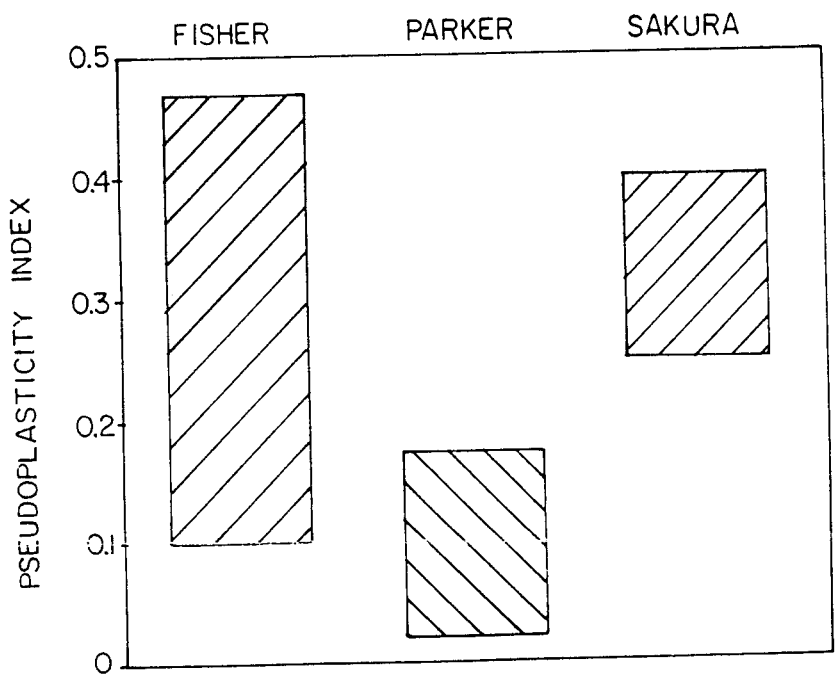

In general, the rheology of an ink composition of the present invention provides significant advantages over known pseudoplastic inks, as shown in FIGS. 5 and 6. In FIG. 5, the viscosity ranges for the inks disclosed by Fisher and Sakura, calculated from viscosity data reported in the respectively cited British patent documents, are contrasted with corresponding ranges typical of a paste ink, a liquid ink, and a writing ink composition of the present invention, respectively. In FIG. 6, the ranges of pseudoplasticity index values estimated for the inks of Fisher and Sakura are compared with the corresponding range of an ink of the present invention.

It is apparent from the aforesaid figures that the high- and low-shear viscosities characteristic of a writing ink within the present invention are wholly distinguishable from those of the Fisher ink. Furthermore, the ink of the current invention has both a higher low-shear viscosity and greater pseudoplasticity (lower pseudoplasticity index) than that taught by Sakura.

In functional terms, the higher low-shear viscosity of an ink within the present invention prevents the refills from seeping, while the greater pseudoplasticity gives rise to less feathering, as discussed in greater detail below. In contrast, the considerably higher low-shear viscosities taught by Fisher require a pressurized cartridge and, moreover, result in less writing smoothness than is characteristic of an ink of the present invention.

The present invention will be further described by reference to the following illustrative examples. The reported values for various writing characteristics were determined using a ballpen that had the design shown in FIG. 4 and incorporated a 0.65 mm alumina ceramic ball. The assessed writing characteristics are defined as follows:

(a) Seep: Seep is determined by suspending the pen uncapped, point down in an oven at 60° C. for 16 hours. The amount of seep was classified visually as: heavy (3), moderate (2), slight (1), and none (0). The amount of seep is preferably 0.

(b) Wicking: The degree of wicking is determined by suspending the pen point down at room temperature with the point in contact with a filter paper for 16 hours. The amount of wicking was determined by weighing 5 units before and after and classified as:

Greater than 10% weight loss = 3
Less than 10%, but greater than 1% = 2
Less than 1%, but greater than 0.1% = 1
Less than 0.1% = 0

It is desirable that the wicking be 0.

(c) Handwriting: Quality of handwriting is assessed for the presence and degree of six negative attributes, each determined on a scale from 0 to 3, as follows:
0—None
1—Slight
2—Moderate
3—Excessive.

The six characteristics are:
"Barbed Wire"
  A tendency for the written line to show "blobs" interconnected with a normal written line.
"Feathering"
  A measurement of the degree of spreading of the ink, showing ragged edges to the written line.
"Drag"
  A measurement of degree to which the pen moves easily over the paper.
"Smoothness"
  A measurement of the ability of the pen to write without excessive noise.
"Directionality"
  A measurement of the degree of non-uniformity of the written line when the pen is moving in different directions.
"Doublelining"
  The tendency for the pen to produce a line which is darker on the edges than it is in the center.

The composite handwriting rating is the arithmetic sum of the values for the six individual characteristics. The scale runs from 0 to 18, with the lowest score indicating the best handwriting.

(d) Meter Rate: The meter rate is determined as the amount of ink transferred to the paper in 200 m of writing by a "FIG. 8" writing machine that generates a line at a rate of 6.6 m min$^{-1}$.

EXAMPLES 1–9 AND COMPARATIVE EXAMPLES 1–7

Examples of ink compositions within the present invention (Examples 1–9) were prepared using the above-mentioned colloid milling technique and either Kelco heteropolysaccharide K1A112 ® (Table 1) or KELZAN S ® (Table 2). The formulation procedure used is more specifically described below:

Step 1: In a high speed mixer (Silverson), ethylene glycol and glycerol were mixed. The resin was then slowly added to the solvent mixture and agitated for at least 15 minutes to form a resin slurry.

Step 2: A separate mixture of water, the biocide MITROL G ST ® (Chapman Chemical Co., Memphis Tenn.), the smoothness additive AQUALOX 225-100 ® (Alox Corp., Niagara Falls N.Y.) and the corrosion inhibitor benzatriazole was subjected to high-speed mixing, again for a minimum of 15 minutes.

Step 3: The solvent and aqueous mixtures were combined, the dye solution BASA CID X34 ® (BASF Wyandotte Corp., Holland Mich.) was added, and the resultant ink composition was subjected to further high-speed mixing, for at least 30 minutes, to produce a partially solvated fine dispersion of the resin.

Step 4: The ink composition was transferred to Speco colloid mill, Model 2.5UB (Speco Corp., Beverly Mass.), and milled for at least 30 minutes at a speed setting of 100 and a gap setting of 0.001 inch. The resulting high-shear conditions converted the composition to a lyophilic sol of the resin.

Step 5: After milling, the ink composition was centrifuged for 10 minutes at 10,000 rpm (20° C. temperature) to remove entrained gases.

In addition to Examples 1–4 (Table 1) and Examples 6–9 (Table 2), comparison ink formulations were prepared using the above-described procedures and constituents, but with resin content not adjusted to yield the crucial rheological values. The above-defined performance characteristics were determined for all examples and comparison examples, with the latter displaying markedly inferior seep and/or meter rate values.

The results summarized in Tables 1 and 2 show that seep and wicking in the ballpen of the present invention decline with the pseudoplasticity index (n) value as resin concentration increases, although seep does not go to zero until yield stress is approximately 25 dyne cm$^{-2}$ or higher. For ink compositions containing K1A112 ®, the basic viscosity and pseudoplasticity requirements of the present invention were met at a resin concentration of about 0.15 weight-percent, relative to total composition weight. The preferred zero-value for seep, however, was achieved when resin content was 0.3 weight-percent or higher. At this concentration, the handwriting characteristic value, which fell initially with increasing resin content due to reduced feathering, was acceptable, although somewhat higher than optimum because of increased double lining. Thus, while a concentration for K1A112 ® of 0.20 weight-percent provides the best handwriting assessment, a content range between about 0.3 and 0.5 weight-percent was preferred for overall performance.

In an ink composition otherwise as shown in Example 2, a high molecular weight block polymer, TETRONIC 1107 ® (BASF Wyandotte Corp., Holland Mich.), was added to a 1 weight-percent concentration to reduce the viscosity at a shear rate of 0.1 sec$^{-1}$ by 5000 cP (approximately a 17% reduction), while leaving the viscosity at 100 sec$^{-1}$ unchanged. Also, a cellulose-derived resin, NATROSOL 250MR ® (Hercules Inc., Naperville Ill.), was added at 1.0 weight-percent to a composition as shown in Example 4 to raise the viscosity at a shear rate of 10,000 sec$^{-1}$ from 11 to 13 cP, an increase of about 20%. The low-shear viscosity was unaffected. Larger amounts of Natrosol 250MR ® affected the viscosity at both high and low shear, although the percentage change at high shear rates was much greater than at low shear rates. For example, 0.5 weight percent content of NATROSOL 250MR ® in an ink as shown in Example 2 raised the viscosity at 10,000 sec$^{-1}$ from 11 to 26, an increase of 136%, while at a shear rate of 0.1 sec$^{-1}$ the viscosity was raised from 30,200 to 43,000 cP, a change of only 42 percent. In Example 8 of Table 2, the addition of 1 weight-percent of the film forming polyvinylpyrrolidone resin K-30 ® (GAF Corp., New York, N.Y.) reduced the viscosity at a shear rate of 0.1 sec$^{-1}$ by 20,000 cP, or approximately 35%. The viscosity at shear rates of 100 sec$^{-1}$ and higher was unaffected.

As shown in Table 2, the rheological parameters of the present invention were not attained until the concentration of xanthan gum (KELZAN S ®) exceeded 0.45 weight-percent, the maximum acceptable value disclosed for the ink composition taught by Sakura. Inks with xanthan gum contents up to 0.92 weight-percent (Example 9) were tested and found acceptable, contrary to Sakura's teachings.

EXAMPLES 10–14

Additional examples of ink compositions of the present invention were prepared as described above, but with much of the water (Examples 10–13) or all of the water (Example 14) replaced with different organic solvents. At a K1A112 ® resin content (0.35 weight-percent), within the preferred range mentioned above, the prerequisite rheological properties of the present invention were readily attained (see Table 3).

EXAMPLES 15–18

The compositions shown in Table 4 illustrate the ability of writing inks within the present invention to provide stable pigment dispersions, for three different pigments. The ink compositions of Table 4 were produced following the above-described colloid milling procedure, with the pigment added during step 2. In Example 17, where a red pigment was used, a lower viscosity at a shear rate of 0.1 sec$^{-1}$ was attained than with the other two pigments. At a shear rate of 10 sec$^{-1}$, however, the red ink had a higher viscosity than the other two. Both Examples 16 and 18 showed a slightly higher viscosity at a shear rate of 0.1 sec$^{-1}$ than the comparable dye containing ink of Example 2. In Example 15, a reduction in low-shear viscosity effected by the addition of the film forming polyvinylpyrrolidone co-resin K-30 ® was compensated for by using a higher concentration of the primary resin, KELZAN S ®, in the absence of K1A112 ® resin.

As indicated previously, it has been determined that the degree of feathering is related to pseudoplasticity. To illustrate this relationship, FIG. 7(A) presents a graph wherein feathering score, determined in a handwriting test as described above, is plotted as a function of pseudoplasticity index for ink compositions containing either K1A112 ® resin (circles) or KELZAN S ® resin (triangles). In FIG. 7(B) the relationship between meter rate and pseudoplasticity index is similarly represented. The graphs show that the respective values for both feathering and meter rate can be related to pseudoplasticity index by linear functions. For values of n belowe about 0.18, feathering is minimized and meter rate is not so high (i.e., greater than about 0.3 g/200 m) that the line is easily smudged.

TABLE 1

| Ingredients (weight percent) | Comparison Example 1 | Comparison Example 2 | Example 1 | Example 2 | Example 3 | Example 4 |
|---|---|---|---|---|---|---|
| Water | 43.20 | 43.15 | 43.10 | 43.05 | 43.0 | 42.90 |
| Ethylene Glycol | 20.0 | 20.0 | 20.0 | 20.0 | 20.0 | 20.0 |
| Gycerol | 10.0 | 10.0 | 10.0 | 10.0 | 10.0 | 10.0 |
| K1A112 ® | 0.20 | 0.25 | 0.30 | 0.35 | 0.40 | 0.50 |
| Corrosion Inhibitor; Biocide Smoothness Additive | 1.6 | 1.6 | 1.6 | 1.6 | 1.6 | 1.6 |
| Basacid X34 ® (Dye Solution) | 25.0 | 25.0 | 25.0 | 25.0 | 25.0 | 25.0 |
| Rheological Properties | | | | | | |
| Pseudoplasticity Index | 0.17 | 0.16 | 0.13 | 0.13 | 0.11 | 0.11 |
| Viscosity (cP) at a Shear Rate of: | | | | | | |
| 0.1 sec$^{-1}$ | 14,200 | 20,300 | 27,000 | 30,200 | 43,000 | 58,000 |
| 1.0 sec$^{-1}$ | 1,800 | 2,560 | 3,300 | 4,050 | 5,300 | 7,400 |
| 10.0 sec$^{-1}$ | 266 | 370 | 455 | 575 | 690 | 970 |
| 100 sec$^{-1}$ | 38 | 48 | 57 | 68 | 80 | 124 |
| 1,000 sec$^{-1}$ | 15 | 17 | 19 | 22 | 24 | 29 |
| 10,000 sec$^{-1}$ | 8 | 9 | 10 | 11 | 12 | 14 |
| Yield Stress (dyne cm$^{-2}$) | 5.1 | 19.5 | 25.6 | 35.8 | 46.1 | 870 |
| Performance | | | | | | |
| Seep | 3 | 2 | 0 | 0 | 0 | 0 |
| Wicking | 1 | 1 | 1 | 0 | 0 | 0 |
| Handwriting | 3.0 | 4.7 | 4.1 | 4.6 | 4.7 | 6.0 |
| Meter Rate (g/200 m) | 0.25 | 0.25 | 0.21 | 0.19 | 0.18 | 0.16 |

TABLE 2

| Ingredients (weight percent) | Comparison Example 3 | Comparison Example 4 | Comparison Example 5 | Comparison Example 6 | Comparison Example 7 | Example 6 | Example 7 | Example 8 | Example 9 |
|---|---|---|---|---|---|---|---|---|---|
| Water | 43.25 | 43.15 | 43.05 | 43.0 | 42.95 | 42.85 | 42.75 | 41.75 | 41.48 |
| Ethylene Glycol | 20.0 | 20.0 | 20.0 | 20.0 | 20.0 | 20.0 | 20.0 | 20.0 | 20.0 |
| Glycerol | 10.0 | 10.0 | 10.0 | 10.0 | 10.0 | 10.0 | 10.0 | 10.0 | 10.0 |
| Kelzan S ® | 0.15 | 0.25 | 0.35 | 0.40 | 0.45 | 0.55 | 0.65 | 0.83 | 0.92 |
| Biocide | 1.6 | 1.6 | 1.6 | 1.6 | 1.6 | 1.6 | 1.6 | 1.6 | 1.6 |
| Corrosion Inhibitor | | | | | | | | | |
| Smoothness Additive | | | | | | | | | |
| Basacid X34 ® (Dye Solution) | 25.0 | 25.0 | 25.0 | 25.0 | 25.0 | 25.0 | 25.0 | 25.0 | 25.0 |
| Rheological Properties | | | | | | | | | |
| Pseudoplasticity Index | 0.33 | 0.32 | 0.28 | 0.25 | 0.21 | 0.18 | 0.14 | 0.17 | 0.15 |
| Viscosity (cP) at a Shear Rate of: | | | | | | | | | |
| $0.1\ \text{sec}^{-1}$ | 800 | 4,000 | 9,500 | 14,300 | 23,000 | 40,000 | 54,500 | 73,400 | 87,400 |
| $1.0\ \text{sec}^{-1}$ | 390 | 1,180 | 2,140 | 3,000 | 4,000 | 5,000 | 7,000 | 11,000 | 12,500 |
| $10.0\ \text{sec}^{-1}$ | 114 | 250 | 390 | 530 | 640 | 880 | 1,100 | 1,600 | 1,730 |
| $100\ \text{sec}^{-1}$ | 25 | 44 | 63 | 78 | 94 | 126 | 152 | 209 | 231 |
| $1,000\ \text{sec}^{-1}$ | 10 | 15 | 20 | 22 | 24 | 29 | 38 | 49 | 54 |
| $10,000\ \text{sec}^{-1}$ | 7 | 8 | 9 | 10 | 11 | 13 | 14 | 18 | 19 |
| Yield Stress (dyne $\text{cm}^{-2}$) | NY* | NY* | NY* | 15.4 | 20.5 | 41.0 | 66.7 | 119.6 | 125.3 |
| Performance | | | | | | | | | |
| Seep | 3 | 3 | 2 | 1 | 0 | 0 | 0 | 0 | 0 |
| Wicking | 3 | 2 | 2 | 2 | 1 | 0 | 0 | 0 | 0 |
| Handwriting | 3.8 | 3.9 | 3.7 | — | 2.9 | 4.5 | 4.5 | 4.7 | 4.7 |
| Meter Rate (g/200 m) | 0.48 | 0.46 | 0.40 | — | 0.33 | 0.30 | 0.26 | 0.25 | 0.22 |

*"No Yield": ink flowed under any load

TABLE 3

| | Example 10 | Example 11 | Example 12 | Example 13 | Example 14 |
|---|---|---|---|---|---|
| Formulation | | | | | |
| Biocide | 1.6 | 1.6 | 1.6 | 1.6 | 1.6 |
| Corrosion Inhibitor | | | | | |
| Smoothness Additive | | | | | |
| Water | 18.9 | 18.9 | 18.9 | 14.2 | — |
| Ethylene Glycol | 37.9 | 37.9 | 37.9 | 37.9 | 20 |
| Glycerol | 18.9 | 18.9 | 18.9 | 14.2 | 10 |
| Gamma Butyrolactone | 18.9 | 0 | 0 | 0 | — |
| N—Methyl Pyrrolidinone | 0 | 18.9 | 0 | 14.2 | — |
| Sulfolane W ® | 0 | 0 | 18.9 | 14.2 | — |
| Special Violet S4BS ® | 3.5 | 3.5 | 3.5 | 3.5 | 3.5 |
| K1A112 ® | 0.35 | 0.35 | 0.35 | 0.35 | 0.35 |
| Formamide | — | — | — | 0 | 64.55 |
| Rheological Properties | | | | | |
| Pseudoplasticity Index | 0.13 | 0.13 | 0.13 | 0.14 | 0.12 |
| Viscosity (cP) at a Shear Rate of: | | | | | |
| $0.1\ \text{sec}^{-1}$ | 42,000 | 42,300 | 46,500 | 43,100 | 33,800 |
| $1.0\ \text{sec}^{-1}$ | 5,330 | 5,350 | 5,880 | 5,540 | 4,270 |
| $10.0\ \text{sec}^{-1}$ | 773 | 782 | 836 | 810 | 591 |
| $100\ \text{sec}^{-1}$ | 118 | 121 | 129 | 133 | 80 |
| $1,000\ \text{sec}^{-1}$ | 45 | 50 | 48 | 52 | 31 |
| $10,000\ \text{sec}^{-1}$ | 22 | — | — | — | 16 |
| Yield Stress (dyne $\text{cm}^{-2}$) | 79.7 | 74.3 | 81.6 | 77.8 | 56.3 |
| Performance | | | | | |
| Handwriting | 3 | 5 | 5 | 6 | — |
| Meter Rate (g/200 m) | 0.18 | 0.17 | — | — | 0.17 |

TABLE 4

| | Example 15 | Example 16 | Example 17 | Example 18 |
|---|---|---|---|---|
| Formulation | | | | |
| Water | 41.65 | 58.05 | 58.05 | 58.05 |
| Ethylene Glycol | 20 | 20 | 20 | 20 |
| Glycerol | 10 | 10 | 10 | 10 |
| K1A112 ® | — | 0.35 | 0.35 | 0.35 |
| Biocide | 1.6 | 1.6 | 1.6 | 1.6 |
| Corrosion Inhibitor | | | | |
| Smoothness Additive | | | | |

TABLE 4-continued

|  | Example 15 | Example 16 | Example 17 | Example 18 |
|---|---|---|---|---|
| Aqueous Pigment Dispersions |  |  |  |  |
| Basoflex Blue 7080 ® |  | 10 |  |  |
| Basoflex Red 3855 ® |  |  | 10 |  |
| Luconyl Green 9360 ® |  |  |  | 10 |
| Kelzan S ® | 0.75 |  |  |  |
| Basacid X34 ® (Dye Solution) | 25.0 |  |  |  |
| K-30 ® | 1.0 |  |  |  |
| Rheological Properties |  |  |  |  |
| Pseudoplasticity Index | 0.12 | 0.13 | 0.15 | 0.14 |
| Viscosity (cP) at a Shear Rate of: |  |  |  |  |
| 0.1 sec$^{-1}$ | 68,100 | 33,400 | 25,100 | 33,200 |
| 1.0 sec$^{-1}$ | — | 4,610 | 5,530 | 4,650 |
| 10.0 sec$^{-1}$ | — | 610 | 786 | 633 |
| 100 sec$^{-1}$ | 204 | 77 | 86 | 77 |
| 1,000 sec$^{-1}$ | 47 | 21 | 22 | 20 |
| 10,000 sec$^{-1}$ | 17 | 10 | 11 | 10 |

What is claimed is:

1. A writing ink composition comprising (i) an amount of at least one pseudoplastic resin and (ii) a carrier medium for said resin, said amount being such that said ink composition has:
   (a) a pseudoplasticity index value between about 0.02 and 0.18;
   (b) a viscosity at 0.1 sec$^{-1}$ shear rate between about 25,000 and 120,000 cP; and
   (c) a viscosity at 10,000 sec$^{-1}$ shear rate between about 6 and 26 cP.

2. A writing ink composition according to claim 1, wherein said pseudoplastic resin comprises at least one compound from the group consisting of xanthan gum and a heteropolysaccharide consisting essentially of glucuronic acid, glucose and rhamose.

3. A writing ink composition according to claim 2 wherein said pseudoplastic resin comprises said heteropolysaccharide.

4. A writing ink composition according to claim 3, wherein said heteropolysaccharide is present in said ink composition in an amount of greater than 0.15 wt %, relative to the total weight of said ink composition.

5. A writing ink composition according to claim 4, wherein said heteropolysaccharide is present in said ink composition in an amount between about 0.3 and 0.5 wt %, relative to the total weight of said ink composition.

6. A writing ink composition according to claim 3, wherein said pseudoplastic resin comprises xanthan gum.

7. A writing ink composition according to claim 6, wherein said xanthan gum is present in said ink composition in an amount greater than 0.45 wt %, relative to the total weight of said ink composition.

8. A writing ink composition according to claim 1, wherein said ink has a yield stress value of between about 25 and 120 dyne cm$^{-2}$.

9. A writing ink composition according to claim 1, wherein said pseudoplasticity index value is between about 0.10 and 0.18.

10. A writing ink composition according to claim 1, wherein said viscosity at 0.1 sec$^{-1}$ shear rate is between about 25,000 and 75,000 cP.

11. A writing ink composition according to claim 1, wherein said viscosity at 10,000 sec$^{-1}$ shear rate is between about 10 and 20 cP.

12. A writing ink composition according to claim 1, said ink composition being substantially waterless.

13. A writing ink composition according to claim 1, where said carrier medium comprises water and at least one organic solvent.

14. A writing ink composition according to claim 4, wherein said organic solvent comprises at least one compound selected from the group consisting of ethylene glycol, glycerol, gamma-butyrolactone, N-methyl pyrrolidone and tetrahydrothiophene 1-1 dioxide.

15. A writing ink composition according to claim 1, wherein said pseudoplastic resin further comprises a second resin compound.

16. A writing ink composition according to claim 1, wherein said second resin compound is a cellulose derivative.

17. A writing ink composition according to claim 15, wherein said second resin compound is a film forming co-resin.

18. A writing ink composition according to claim 17, wherein said co-resin is polyvinylpyrrolidone.

19. A writing ink composition according to claim 1, further comprising a surfactant.

20. A writing ink composition according to claim 19, further comprising an aqueous dispersion of a pigment.

21. A writing ink composition according to claim 1, wherein said pseudoplastic resin forms a lyophilic sol in said carrier medium.

22. A method for preparing a writing ink composition comprising (i) an amount of at least one pseudoplastic resin and (ii) a carrier medium for said resin, said method comprising the steps of (1) adding a predetermined amount of said pseudoplastic resin to an organic liquid to produce a slurry of said resin in said organic liquid; (2) mixing said slurry with a solvent comprising at least one from the group consisting of water and an organic solvent in which said resin is soluble, said mixing being carried out under sufficiently high shear conditions such that a partially solvated fine dispersion of the resin is produced; and then (3) adding a colorant to said partially solvated fine dispersion and subjecting said partially solvated fine dispersion to hydraulic shear such that a fully solvated lyophilic sol of said resin is produced, said lyophilic sol having (a) a pseudoplasticity index value between about 0.02 and 0.18, (b) a viscosity at 0.1 sec$^{-1}$ shear rate between about 25,000 and 120,000 cP and (iii) a viscosity at 10,000 sec$^{-1}$ shear rate between about 6 and 26 cP.

23. A method according to claim 22, where step (2) comprises mixing said dispersion with water.

24. A method according to claim 22, wherein said pseudoplastic resin comprises at least one compound from the group consisting of xanthan gum and a heteropolysaccharide consisting essentially of glucuronic acid, glucose and rhamose.

25. A method according to claim 24, wherein said pseudoplastic resin comprises a heteropolysaccharide consisting essentially of glucuronic acid, glucose and rhamose.

* * * * *